(No Model.)

J. P. TADDER.
SLED BRAKE.

No. 410,466. Patented Sept. 3, 1889.

Witnesses
G. S. Elliott
T. W. Johnson

Joel P. Tadder.
Inventor

By his Attorneys

UNITED STATES PATENT OFFICE.

JOEL P. TADDER, OF HENRIETTA, WISCONSIN.

SLED-BRAKE.

SPECIFICATION forming part of Letters Patent No. 410,466, dated September 3, 1889.

Application filed June 20, 1889. Serial No. 314,955. (No model.)

*To all whom it may concern:*

Be it known that I, JOEL P. TADDER, a citizen of the United States of America, residing at Henrietta, in the county of Richland and State of Wisconsin, have invented certain new and useful Improvements in Sled-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to brakes for sleds; and it consists in certain improvements on the construction shown in the expired United States Patents Nos. 67,132 and 142,632, whereby the construction is greatly simplified and the number of parts considerably reduced and better disposed with a view of securing more effective service.

Figure 1:
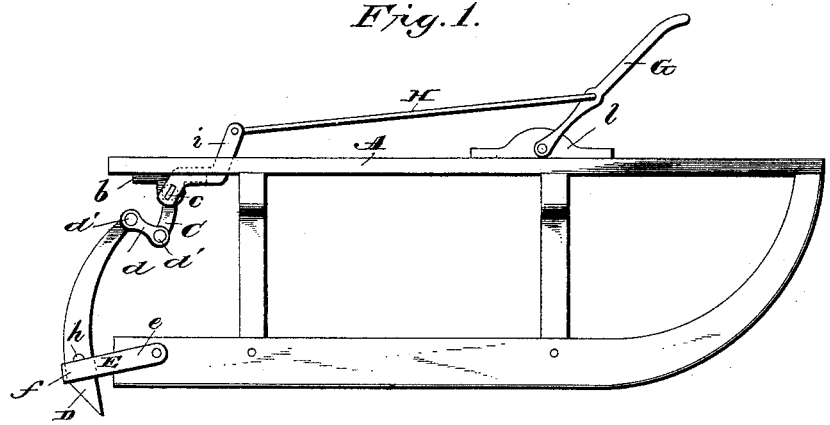
Figure 2:
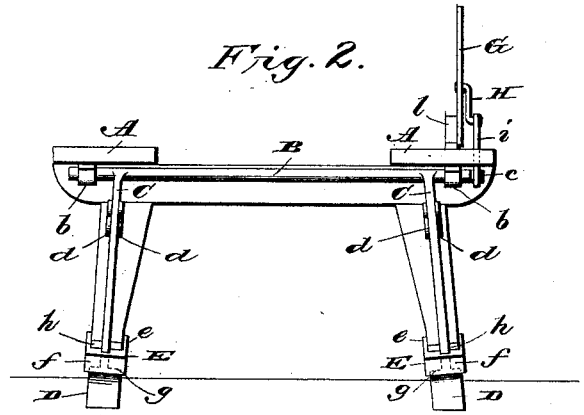
Figure 3:
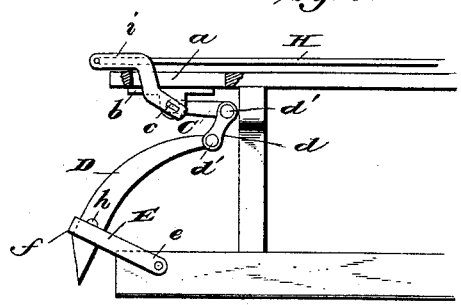

In the accompanying drawings, forming part of this specification, Figure 1 is a side view of a sled provided with my improvements, and showing the brake-dogs depending to "brake" the movement of the sled. Fig. 2 is a rear view of Fig. 1; and Fig. 3 is a detail side view showing the inoperative position to which the parts are thrown, either through the medium of the lever or when brought in contact with an obstruction.

As shown in said Patent No. 67,132, referred to, the number of bends and joints renders the arrangement quite complex, and certainly serves to increase the expense attendant upon the production of the attachment. What is more, the brake-dog is arranged horizontally with respect to its pivotal connection with the runner, and in the event of its meeting with an obstruction is not calculated nor so disposed as to yield, but will probably result in either dangerous swerving of the sled or in damaging the parts. My improvements overcome these objections and yet present a more simple and effective arrangement.

The top A of the sled is provided at one side and near its rear with a longitudinal slot $a$.

Depending from the rear part of said top and at each side thereof are two hangers $b$, in which bears a transverse horizontal shaft B, one of the projecting ends $c$ of which is rectangular.

Integrally formed with said shaft near the inner side of each hanger is an arm C, the lower end of which is pivotally connected to the upper end of the curved brake-dog D through the medium of a horizontal link $d$ and removable pivot-bolts $d'$.

A metal yoke E is provided for each runner and has a bifurcated portion $e$ embracing the rear portion of its said runner F, the outer free portion $f$ of said yoke being formed by a block having a vertical rectangular perforation therein.

The lower terminal of each brake-dog is of approximately a spear shape, and is enlarged to furnish a shoulder $g$, upon which rigidly bears the under side of the block $f$, which is clamped in contact therewith by means of a removable key $h$, which passes through a transverse opening in the shank of the dog and has a beveled lower face to correspond with the upper surface of the block.

An arm $i$ is connected at its lower end to the square terminal portion of the shaft, and said arm is of the peculiar form shown in Figs. 1 and 3, consisting of the central portion and inclined ends extending relatively therefrom. It will be noted that the central portion and upper end are designed to respectively occupy a part of the slot and be above the same.

A lever G is pivoted to the base of the segment $l$, located near the front of the top, said lever being connected to the upper end of the arm $i$ by a rod H.

When the brake is in an inoperative position, the parts are as shown in Fig. 3, the upper part of the arm being in substantially a horizontal position and in line with the connecting-rod. It will also be seen that the position of the brake-dog connection and that of the rod with the arm $i$ have both been changed in their relative location at either side of the shaft. This adjustment is sufficient to enable the operator to hold the parts in this position by the aid of the lever; but to lock them it will only be necessary to further depress said lever to bring its pivot on a dead-center with its connection with the rod and thereby clamp the parts against accidental movement. The central portion of the arm $i$ bears against the rear wall of the slot and also assists in the binding action. The movement of the lever, as represented in Fig. 1, will throw the dogs into operative position and again shifts the pivotal connections of the rod H and said dogs. The movement of the latter being in the arc of a circle, any contact with an unyielding substance will result in their being automatically lifted to clear the obstruction.

When it is necessary to sharpen the end of each dog, the pivot-bolt connecting it to the link is removed and the key clamping it to the yoke is withdrawn, after which the shank of the dog may be removed through the rectangular recess in the yoke.

Another feature connected with my improvement consists in the location of all the parts, including the arm $i$, within the limits of the seat and runners. If the arm $i$ were on the outside, it would furnish an objectionable projection.

I claim—

1. The combination, in a sled-brake, of the vertically-curved dogs pivotally hung at each side and each provided with an enlarged head forming a horizontal shoulder, and a horizontal yoke pivotally connected to each runner and having a vertical perforation for the passage of a dog-shank, and a beveled key passing through a perforation in the latter to clamp the yoke on the shoulder, substantially as set forth.

2. The combination, with the slotted top, of the hangers depending therefrom, a shaft bearing therein and provided with integral arms, vertically-curved dogs pivotally connected by links with said arms, horizontal yokes pivotally connecting the dogs and runners, and arm $i$, pivoted in the slot of the top and connected to the end of said shaft, and consisting of inclined end and central portion, located as described, and a rod connecting said arm $i$ and an operating-lever, said rod and lever being adapted to be thrown on a dead-center, substantially as set forth.

In testimony whereof I affix my signature in presence of two witnesses.

JOEL P. TADDER.

Witnesses:
 A. FERGUSON,
 G. W. WEEDEN.